UNITED STATES PATENT OFFICE.

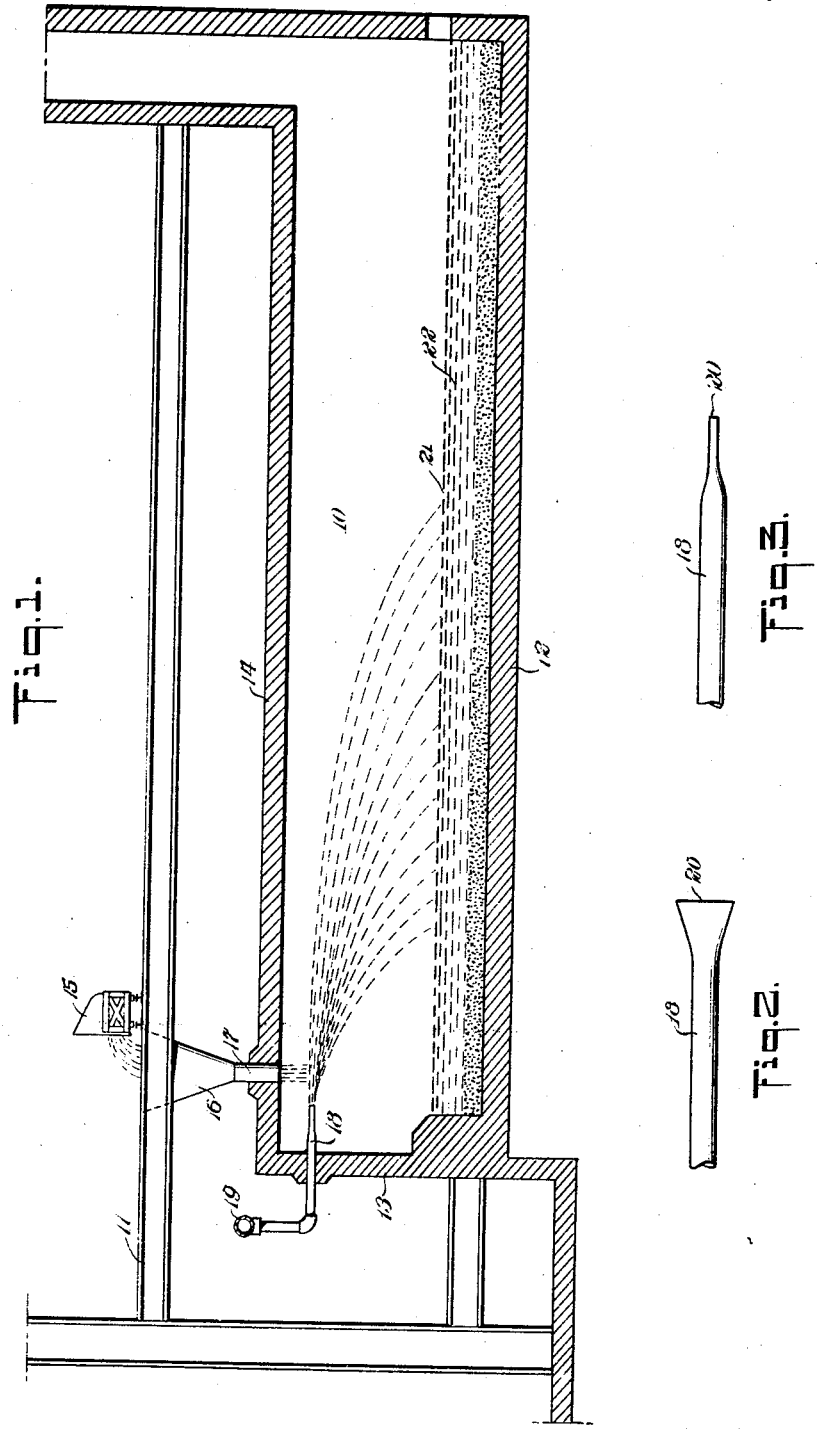

SAMUEL RICHARD GARR, OF CHULA, MISSOURI, ASSIGNOR TO AMERICAN SMELTING AND REFINING COMPANY, OF NEW YORK, N. Y., A CORPORATION OF NEW JERSEY.

METHOD FOR GRANULATING CONVERTER-SLAG.

1,378,223.     Specification of Letters Patent.     Patented May 17, 1921.

Application filed October 18, 1919. Serial No. 331,705.

*To all whom it may concern:*

Be it known that I, SAMUEL RICHARD GARR, a citizen of the United States, and resident of Chula, in the county of Livingston and State of Missouri, have invented certain new and useful Improvements in Methods for Granulating Converter-Slag, of which the following is a specification.

The invention relates in general to an improved process for disintegrating a falling stream of molten material and specifically relates to an improved process for placing molten converter slag into a condition in which it can be effectively utilized as a flux in the treatment of ores in a reverberatory furnace.

In certain smelting operations, such for instance, as where copper matte is produced, converter slag is sometimes poured in a solid stream into the ore smelting furnace with the intent of utilizing certain elements of the converter slag to aid the fluxing of the ore charge in the reverberatory furnace. Heretofore this method has not proved satisfactory, among other reasons, due to the fact that the stream of molten slag maintained its solidity more or less and while in this condition, the fluxing ingredients present did not mix properly with the ore charge.

Accordingly, one of the objects of the invention is to provide a simple mode of treating the stream of slag so as to open up this stream, or to disintegrate the slag material so as to make the fluxing content available for use in a reverberatory furnace or similar ore treating container.

Broadly, this object is attained by projecting a stream of fluid, such as steam under comparatively high pressure, against the falling stream of molten slag as it is introduced into the furnace and in a direction to cause the slag stream to spread over a material area of the surface of the ore charge in the furnace.

Reference is made to the accompanying drawings to show one form of instrumentality, by means of which the method disclosed may be effectively practised.

In the drawing:—

Figure 1 is a longitudinal, vertical sectional view taken through a reverberatory furnace of conventional form, equipped with attachments for practising the new process; and Figs. 2 and 3 are respectively a plan view and a view in side elevation of the fluid projecting nozzle shown in Fig. 1.

In the drawings, there is shown a reverberatory furnace 10, mounted in a suitable frame-work 11 and having the usual bottom or bed 12, front wall 13 and roof 14 all as is usual in well known forms of such furnaces. Also following known structures there is outlined diametrically, a slag pot 15 adapted to contain the molten converter slag shown in the act of dumping the slag into the hopper 16. The funnel 17 of the hopper leads through the roof 14 at one end of the furnace and the stream of molten slag falls vertically into the upper portion of the furnace. Mechanism is provided for directing a strong blast of fluid against one side of the falling stream just below its entrance into the furnace. This mechanism includes a fish tail nozzle 18 positioned to extend through the front wall 13. The nozzle is in fluid communication with a source of fluid supply, herein indicated diagrammatically by the supply pipe 19. The fluid is preferably steam under relatively high pressure. The discharge end 20 of the nozzle is flat as shown in Fig. 3, is of relatively wide extent as shown in Fig. 2, and is positioned with the flat side disposed horizontally as shown in Fig. 1, so as to cause the projected steam to contact entirely across the slag stream.

The nozzle is so positioned as to direct the fluid stream in a substantial horizontal direction against the falling stream of molten slag and to act thereon with a force sufficient to open up the stream and spread the particles thereof over a material area of the surface 21 of the ore charge 22 on the bottom 12 of the furnace, as shown in Fig. 1.

Steam has been used efficiently as the projecting fluid, as this substance can be provided economically under high pressure and has other advantages when used in the situations suggested, but it is to be understood that air under high pressure can be used. Again, under certain conditions as where a forced draft is utilized to introduce other materials into the furnace, this forced draft and the material introduced thereby, may be employed to act on, disintegrate and scatter the flux stream equally well with the steam herein suggested as the preferred means.

The converter slag when treated as thus outlined granulates and diffuses in the space above the ore bed and is carried along by the draft in this space. This forced draft opening the slag stream, renders its content available as a fluxing agent and enhances its capacity to combine effectively with the ore charge in the furnace.

Having thus described my invention, I claim:—

1. In the art of granulating converter slag as it is fed to an ore smelting reverberatory furnace, the process which consists in pouring a molten charge of the slag in a stream into the furnace and projecting a stream of steam under relatively high pressure against the falling slag stream to cause a distintegration of the slag and to spread the same over a large portion of the surface of the reverberatory charge in the furnace.

2. In the art of feeding converter slag to a furnace during a metallurgical treatment of ores, the process which consists in pouring a molten charge of the slag in a stream into the furnace and simultaneously projecting a stream of steam under pressure against the falling slag stream thereby to cause the slag stream to spread out over a large portion of the furnace.

3. In the art of feeding converter slag to a furnace during a metallurgical treatment of ores, the process which consists in pouring a molten charge of the slag in a stream into the furnace and simultaneously projecting a flat, horizontally extending stream of fluid under pressure against the falling slag stream thereby to spread the falling slag stream.

4. In the art of adding a flux to the ore charge in a reverberatory furnace, the process which consists in introducing a molten flux containing substance into the furnace in the form of a freely falling stream and simultaneously blowing a charge of fluid under pressure against said falling stream thereby to cause the same to spread out over a relatively large area of the ore charge.

5. In the art of granulating a molten substance as it is subjected to a heating action in a furnace, the process which consists in causing a stream of the molten substance to fall freely in space within the furnace and simultaneously projecting a stream of a fluid under pressure into the furnace and in a substantially horizontal direction against said molten substance stream thereby to disintegrate the stream and spread the substance over a relatively large area of the charge in the furnace.

6. The process which consists in causing a molten stream of converter slag to fall in space, simultaneously projecting a stream of steam under pressure against said falling molten slag and causing the resulting flux to fall in a diffused condition onto a charge of hot ores.

7. A reverberatory furnace provided with a material feeding inlet for directing a falling stream of material into the upper portion of the interior of the same, and means for directing a charge of fluid under pressure against a side of said falling stream.

8. A reverberatory furnace having a material feeding inlet for admitting a stream of falling material to the furnace and a horizontally disposed steam nozzle for directing a jet of steam into contact with said falling stream thereby to spread the same in a direction away from said nozzle.

Signed at Chula, in the county of Livingston, and State of Missouri, this 16th day of September, A. D. 1919.

SAMUEL RICHARD GARR.